Figure 1:
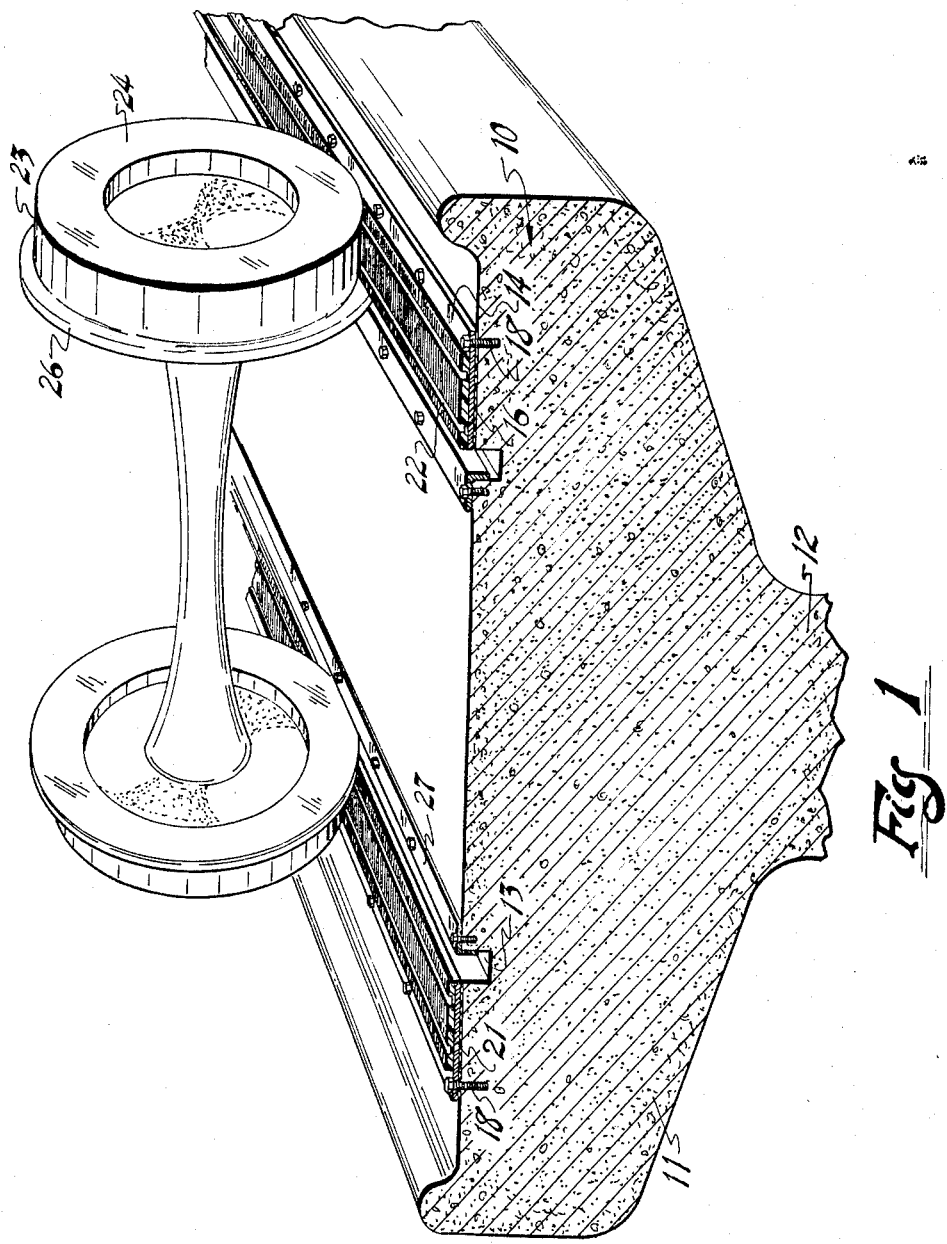

Oct. 11, 1966  L. G. ANDERSON  3,278,123
RAILROAD RAILS
Filed Sept. 23, 1963  5 Sheets-Sheet 1

LEWIS G. ANDERSON
INVENTOR.

BY
ATTORNEY

Oct. 11, 1966  L. G. ANDERSON  3,278,123
RAILROAD RAILS
Filed Sept. 23, 1963  5 Sheets-Sheet 2

LEWIS G. ANDERSON
INVENTOR.

BY *W. H. Morey*
ATTORNEY

Oct. 11, 1966  L. G. ANDERSON  3,278,123
RAILROAD RAILS

Filed Sept. 23, 1963

5 Sheets-Sheet 3

LEWIS G. ANDERSON
INVENTOR.

BY *W. H. Morey*
ATTORNEY

Oct. 11, 1966     L. G. ANDERSON     3,278,123
RAILROAD RAILS

Filed Sept. 23, 1963     5 Sheets-Sheet 4

LEWIS G. ANDERSON
INVENTOR.

BY
ATTORNEY

Oct. 11, 1966   L. G. ANDERSON   3,278,123
RAILROAD RAILS
Filed Sept. 23, 1963   5 Sheets-Sheet 5
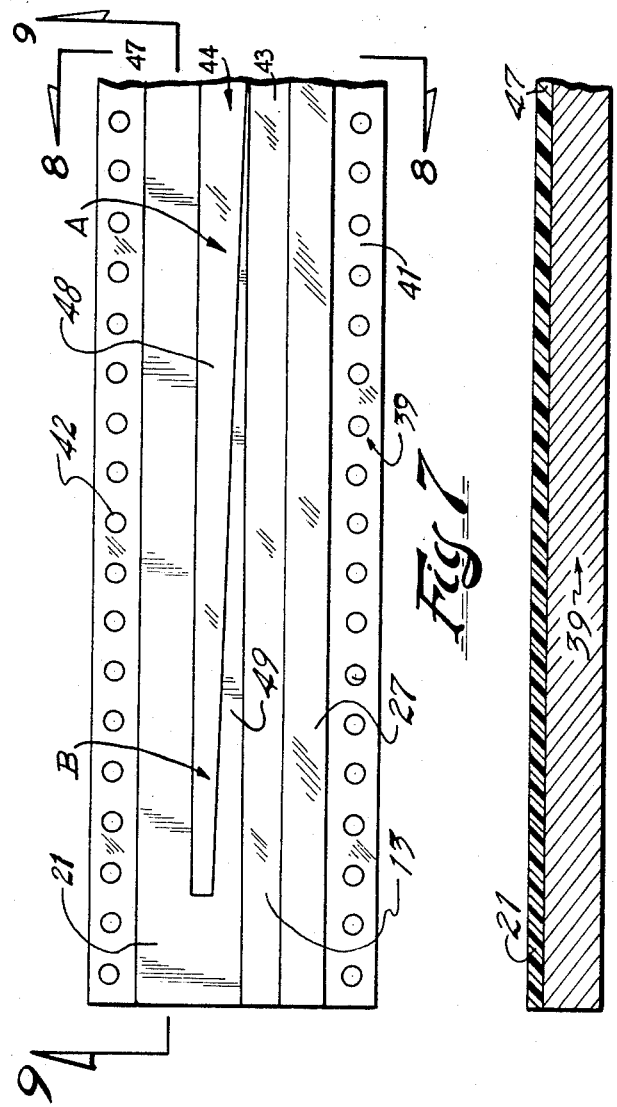
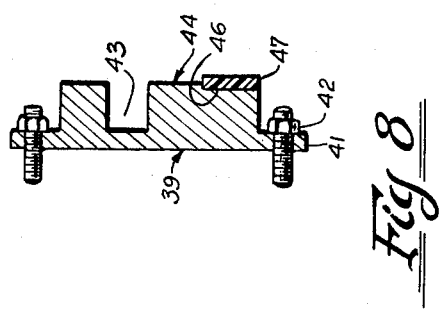
LEWIS G. ANDERSON
INVENTOR.
BY  W. A. Morey
ATTORNEY

United States Patent Office 3,278,123
Patented Oct. 11, 1966

3,278,123
RAILROAD RAILS
Lewis G. Anderson, 285 Nuttall Road, Riverside, Ill.
Filed Sept. 23, 1963, Ser. No. 310,609
19 Claims. (Cl. 238—2)

My invention refers in general to railroad rails of a new and improved design and is particularly suited for use by intracity vehicles utilizing flanged metal wheels.

For many years track for vehicles employing flanged metal wheels has been formed by laying conventional railroad rail on wooden ties resting usually on crushed stone or other suitable ballast. This conventional rail is formed of a generally horizontal flat based section surmounted by an upright web of substantial height which in turn supports an integrally formed rail head for engagement with the tread of a flanged wheel. The many advantages of this old and well-known structure are widely recognized, but in certain instances it exhibits highly undesirable characteristics. For example, flanged steel wheels rolling over such a track are very noisy, thus rendering the use of a combination of steel rails and steel wheels undesirable in areas of reasonably dense population such as in cities or their suburbs.

Various expedients have been proposed to overcome this difficulty as for example, interposing a layer of rubber between a flanged steel tire and a metal vehicle wheel, but these have been only partially successful for various reasons, including the cost and difficulty of maintenance. The riding qualities of a vehicle traveling along such a system have also presented a troublesome problem and despite expensive and elaborate suspension systems on the vehicles, have not attained the desired freedom from vibration.

The abovementioned difficulties are, of course, particularly applicable to "rapid transit systems" which usually operate in densely populated areas. In many instances, the density of population, land values and other requirements dictate the use of elevated tracks supported over streets on steel structures which, of course, magnify the noise problem.

In subways, which frequently employ a tunnel structure of generally circular cross section, the noise problem is particularly severe, the riders at times being subjected to sound intensities attaining the level of pain generation.

Considerable economy of space at ground level and cost could be attained in the case of elevated trackage by utilizing reinforced concrete structures rather than steel for supporting the track, but this economy has proven difficult to attain. For example, conventional railroad rail laid directly on concrete produces, beneath the rail, questionably high-concentrated loads when a vehicle passes along the rail. Vibration accompanies this high unit loading, producing a fretting and partial disintegration of the concrete under the rail. When wooden ties are employed on such a structure, some degree of resilience is attained as well as a reduction in the unit load on the concrete, but some of the economy is lost and difficulty is experiencey in securing and maintaining the wooden tie. Thus, in some instances pneumatic tired vehicles have been used to operate over such concrete structures and in subways despite their obvious drawbacks.

A primary object of my invention is therefore the provision of an improved railroad rail which substantially reduces the noise generated by passage of a metal wheeled vehicle along the rail.

Another important object of my invention is the provision of an improved railroad rail so constructed and arrangd as to permit attachment of the rail directly to a concrete supporting member without the use of wooden ties or the like.

Figure 2:
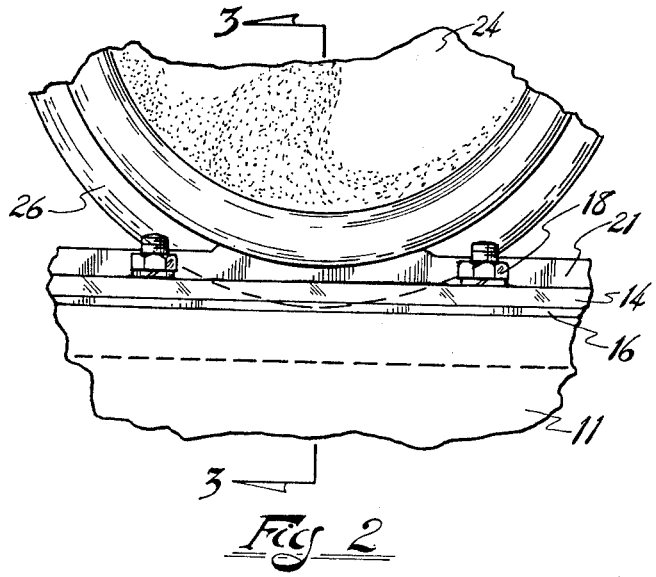
Figure 3:
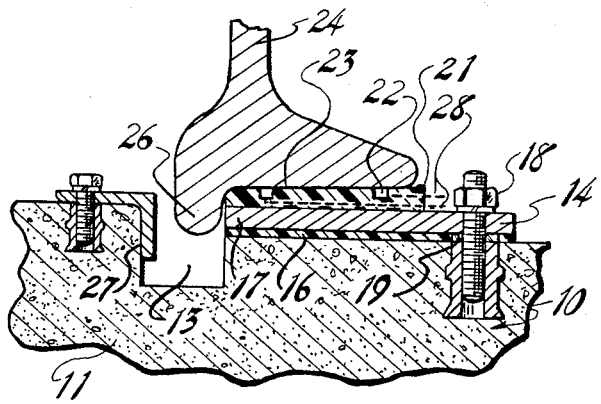
Figure 4:
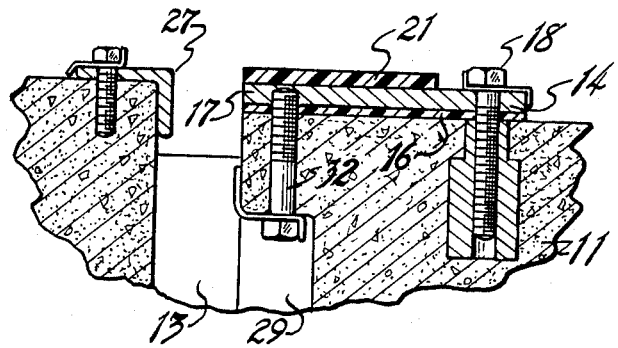
Figure 5:
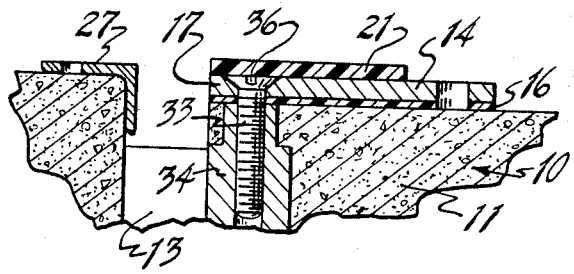
Figure 6:
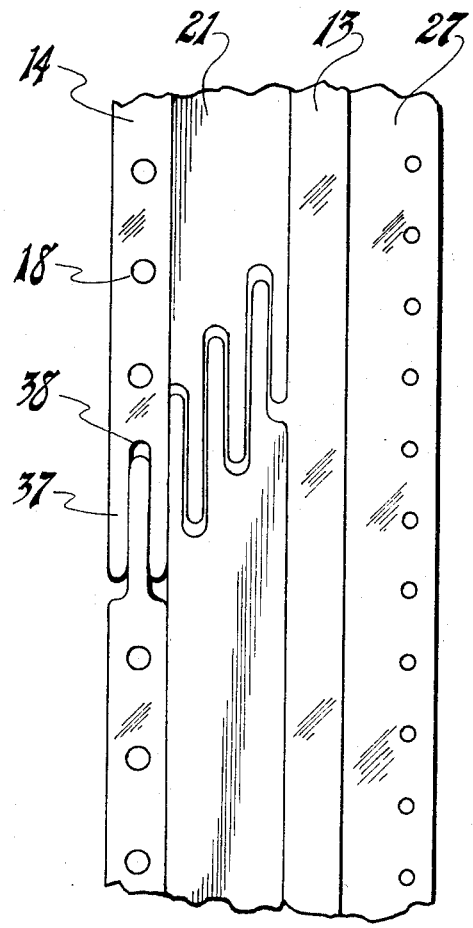

These and other important objects of my invention will become apparent in the following detailed description and the appended drawings in which:

FIGURE 1 is a sectioned perspective view of my improved rail assembled as a railroad track;
FIGURE 2 is a partial elevation through my rail;
FIGURE 3 is a section along the line 3—3 of FIGURE 2;
FIGURE 4 is a partial vertical section through a modified form of my rail;
FIGURE 5 is a partial vertical section through another modified form of my rail;
FIGURE 6 is a plan view of a suitable expansion joint for my rail;
FIGURE 7 is a plan view of a transition section;
FIGURE 8 is an end view along the line 8—8 of FIGURE 7; and
FIGURE 9 is a vertical section taken along the line 9—9 of FIGURE 7.

Briefly, my rail in its preferred form utilizes a relatively thin rigid elongated metal base member having a lower layer of elastomer bonded to its lower surface for engagement with a continuous supporting structure of suitable material such as concrete. Along the upper surface of the elongated base is a similar but somewhat thicker layer of elastomer also bonded to the base and having its inner edge in alignment with the inner edge of the base as well as with the outer edge of a flange receiving depression or groove formed in the supporting structure. Metallic conductors are embedded when desired in the surface of the upper elastomer layer for contact with the tread of a flanged metal wheel traveling along the rail in such manner as to establish electrical contact for signaling purposes.

The selection of materials having suitable properties and the dimensions of these materials are of major importance. For example, rubber is not practical in its conventional form for use as an elastomer on my rail. Preferably, the upper and lower elastomer layers are formed of solid polyurethane, which possesses the necessary physical and chemical properties for my purposes. Even this material, however, will not yield satisfactory performance unless it is of such dimension as to limit the average compressive load to which it is subjected by the wheel to less than approximately 3,000 p.s.i. It is therefore at times necessary to increase the tread width of the vehicle wheel which engages the upper elastomer layer sufficiently to accomplish this objective and also to maintain certain minimum wheel diameters.

Throughout the following detailed description reference will be made to a concrete supporting structure principally because such a structure is well adapted for my purpose and is economical. It should be understood, however, that other forms of supporting structures, such as wood or metal, may be utilized as required by circumstances.

Referring to the drawings, I have illustrated in FIGURE 1 the general arrangement of my rail assembled on a supporting structure 10 as a railroad track suitable for use by standard gauge transit vehicles. The support 10 may utilize a slab 11 of reinforced concrete supported on pillars 12 and defining a flat upper surface having spaced parallel grooves 13. As shown more clearly in FIGURES 2 and 3, my rail utilizes a base 14 preferably having a lower layer 16 of suitable elastomer such as polyurethane applied to its lower surface for engagement with the slab 11. By way of example, the base 14 may be formed of sandblasted steel plate approximately ½ inch in thickness and three to ten inches in width. The lower elastomer layer 16 may be approximately ¼ inch thick and extends across the entire lower surface of the base 14.

The inner edge 17 of the base 14 is aligned with the outer edge of the groove 13. A series of spaced openings are formed in the base 14 near the outer edge to receive bolts 18 or other suitable fastening means for securing the base 14 to the slab 11. If bolts are utilized, a washer 19 is also employed between the base 14 and the support 10 fitting into an opening formed in the lower elastomer layer 16.

On the upper surface of the base 14 and in alignment with the inner edge 17, I form an upper elastomer layer 21 of an elastomer such as solid polyurethane of suitable thickness, usually from ½ inch to 1½ inches thick and having a width proportionate to the expected wheel load, usually about 4 inches. Both the width and the thickness of this layer are of importance and may vary in a manner subsequently described, but will range in width from a minimum of approximately 2 inches to a maximum of approximately 12 inches and may vary in thickness from ⅜ inch to 1½ inches. The width of the base 14 is, of course, controlled by the necessary width of the upper elastomer layer 21 and should exceed the dimension of this layer by at least one inch. When continuously supported, the width of the base will be at least twice its depth.

When desired for signal purposes, at least one flexible metallic conductor 22 and preferably two are embedded in the upper layer 21 with the surface of the conductor 22 flush with the surface of the upper layer 21 in such manner as to make contact with a tread 23 of a flanged metal vehicle wheel 24.

I prefer to form the upper and lower elastomer layers 21 and 16 by casting polyurethane in a suitable mold directly in contact with the cleaned metal surface of the base 14 and the flexible conductors 22. Casting is preferably conducted under vacuum to insure against porosity in the elastomer, and under such conditions an excellent bond can be attained between the steel members and the elastomer. A good bond can be attained with other metals such as copper or with certain plastics such as the fiber-reinforced polyester resins which may be substituted for the metallic base 14. This substitution ordinarily is less desirable from a cost standpoint but when utilized, the thickness and construction, as well as the material selected, should possess sufficient strength and other obvious characteristics for the intended purpose. Similarly, other plastics may be selected in place of polyurethane, but since this material possesses a majority of the desired characteristics in adequate measure, this description will be confined thereto.

In general the strength of a solid polyurethane plastic varies with its hardness which is normally measured by the A scale on a Shore Durometer. The hardness of the upper layer 21 and the lower layer 16 should be between 70 and 100 Shore Durometer A and preferably in the range of 80 to 95. As the hardness of this material approaches 95, the tensile strength will approach 8,800 p.s.i., and the same material will support approximately 700 p.s.i. with a deflection of approximately 5 percent. These characteristics may be modified by incorporating reinforcing materials, such as woven cloth sections of organic or inorganic material, chopped fiber and other materials which will substantially increase the tensile strength. Ordinarily these are not necessary but may be utilized if desired.

In determining the width and the thickness of the upper polyurethane layer 21 consideration must be given to the load imposed on the layer by the wheel and the diameter of the wheel. The loading may be calculated by first computing the projected area of the elastomer in contact with the wheel and dividing the total load imposed by the wheel by this area in square inches. The width should be selected such that this figure does not exceed 3,000 and is preferably on the order of 1,000 p.s.i. or less. For a majority of the loads encountered in rapid transit service the width of the upper elastomer layer will be at least 2 inches, which is less than the width of the tread section of a conventional rapid transit railway car wheel. Modified wheels are, however, often preferable and the width of the tread 23 and the upper elastomer layer 21 may be extended to 12 inches without adverse effect. These same wheels may, if necessary, operate over conventional railroad rails of suitable height when required. The rolling resistance encountered by the wheel will vary somewhat with the hardness of the elastomer in the upper layer 21 and with the deflection produced therein by the wheel. The maximum permissible deflection of the upper layer 21 under maximum wheel load is 50 percent of the thickness of the layer and is preferably less than 25 percent. The deflection, however, produced by the vehicle wheel in the upper elastomer layer must be sufficient to insure some degree of resiliency, and should therefore be not less than 5 percent of the thickness of the layer.

An approximation of the maximum permissible wheel load on the upper layer may be obtained by application of the following formula:

$$M = 6000W\sqrt{d/2(2r - d/2)}$$

wherein $M$ = maximum permissible wheel load, pounds
$W$ = width of upper polyurethane layer, inches
$d$ = depth of upper polyurethane layer, inches
$r$ = tread radius of vehicle wheel, inches It will be understood that the minimum polyurethane hardness will be 70 Shore Durometer A and $2h < d$ when $h$ is the deflection in inches. For more normal use and improved wear, the foregoing is modified as follows:

$$M = 1800W\sqrt{d/10(2r - d/10)}$$

As will be apparent from the foregoing, a substantial increase in durability of the upper layer 21 will be experienced as the load per unit of area is reduced. From cost consideration however, even under conditions of heavy traffic, a minimum load of 200 pounds per square inch should be employed.

The lower layer 16 of elastomer is utilized to accommodate minor irregularities in the surface of the slab 11, and thus in conjunction with the base 14 to distribute the load of the wheel more evenly. In addition, it provides additional sound deadening properties to the rail, as well as some cushioning. For an average well-prepared concrete surface a thickness of 0.250″ is sufficient, but for rough surfaces, a greater thickness may be required.

This lower elastomer layer is not in all instances essential. The base 14 may, when required, be secured directly to a smooth continuous surface of wood or even of steel, but some loss of resilience and sound deadening qualities must be expected. Furthermore, my rail may be carried, when necessary, by spaced supports, such as ties, but under such conditions the thickness and strength of the base 14 must be increased to span the distance between supports.

As previously mentioned, other elastomers may be substituted for polyurethane. The substitute material, however, should possess similar characteristics of importance in such applications. For example, the material should be comparable or superior to the polyurethane herein defined in tensile strength, abrasion resistance, coefficient of friction, resistance to high and low temperatures, resistance to weathering, resistance to solvents, ease and strength of bonding, resiliency, resistance to cold flow, and compression set.

The wheel 24 may utilize a conventional railroad wheel flange 26 which normally projects downwardly into the groove 13, and is adapted to maintain the wheel 24 in alignment with the track by engagement with the inner edge 17 of the base 14. However, when required the depth of the flange should be increased to insure contact with the base 14 under all conditions. In instances where high lateral forces may be expected, as for example on curves, the inner wall of the groove 13 may be provided with a metal facing 27 secured to the slab 11 and adapted to engage the inner face of the flange 26 in a direction resisting the lateral force.

The flexible conductors 22, preferably of steel, may be embedded in the upper layer 21 of one rail only in such manner that the tread 23 of the wheel 24 will establish contact between the two conductors. Alternatively, one of the conductors 22 may be embedded in each of the rails and a signaling circuit completed through the two wheels and axle of the vehicle in conventional manner. The thickness of the flexible conductors 22 should not exceed one third the thickness of the upper layer 21. Conductors 28 attached to the conductors 22 may be embedded in the upper layer 21 and terminated in external leads along the outer edge of the upper layer 21 for connection with a conventional railroad signaling system.

In FIGURES 4 and 5 I have illustrated alternate and supplemental methods for attaching my rail to a supporting structure 10. As illustrated in FIGURE 4, the groove 13 may be modified by providing undercuts 29 periodically along the lower, outer wall of the groove 13. Bolts 32 may thus be inserted through the supporting slab 11 and the undercut 29 into threaded engagement with the base 14, preferably near the inner edge 17 of this member.

An additional alternate method of securing the base 14 to the support 10 is shown in FIGURE 5 wherein a countersunk opening is formed extending through the base 14 and the upper and lower elastomer layers 16 and 21. A bolt 33 having a countersunk head extends through the opening in the base 14 into threaded engagement with an insert 34 in the supporting structure 10, the head of the bolt 33 being flush with the upper surface of the base 14. A plug 36 of polyurethane is bonded to the upper surface of the bolt 33, the upper surface of the plug 36 being flush with the upper surface of the layer 21.

Several possible configurations exist for the joint between sections of the rail. A butt joint should be avoided since the line of the joint would be transverse to the rail and therefore subject at one instant to a substantial portion of the wheel load. Preferably, a joint of the type illustrated in FIGURE 6 should be employed which also permits expansion and contraction of the rail without distortion. As is apparent from FIGURE 6, the end of each rail is provided with a series of substantially equal fingers 37 and grooves 38, each extending completely through the base 14 and the upper and lower elastomer layers 21 and 16 and parallel to the major rail axis. The grooves of one member are adapted to receive the fingers of the mating member in such manner to provide a properly aligned track section. Preferably, the ends of the fingers 37 and grooves 38 are arranged at an angle of approximately 30° or more to the major axis of the rail.

Ordinary joints may be formed by cutting the ends of the rails to form a joint whose axis is at 30 to 60° to the rail axis, or to form a joint in the form of an elongated V.

In areas of exceptionally severe wear, or at points where rails of the type herein described connect to rails of the conventional type, a transition section illustrated in FIGURES 7 and 9 is employed. The purpose of this section is to smoothly and gradually transfer support of the wheel tread from the upper elastomer layer 21 to complete or partial support of the tread by a metal or rigid elastomer member. The section employs a steel base member, generally designated 39, of substantial width and depth, and defines base flanges 41 for attachment to slab 11 by bolts 42. A groove 43, of similar dimension to groove 13 and adapted for alignment therewith, defines a steel tread supporting surface, generally designated 44. The outer extremity of surface 44 has a ledge, indicated at 46, extending along its outer edge to which a layer 47 of elastomer is secured. The thickness of the elastomer layer 47 at end A should be equal to the thickness of layer 21, projecting upwardly beyond surface 44 a distance equal to one fourth to one half its thickness and may be approximately half the width of layer 21.

The tread supporting surface 44 decreases in height and in width from A to B, defining a tongue 48, the narrow end of which is well below the level of a wheel supported on elastomer layer 21. Along the inner side of tongue 48, the base 39 is also cut away to receive a matching tongue 49 of elastomer whose upper surface is in the same plane as that of layer 47.

As will be apparent from the foregoing, a wheel near end B of the transition section will be supported entirely by the upper elastomer layer 21. As the wheel moves toward end A, the wheel support will gradually be taken over by the tongue 48. As the end A is reached, a majority of the wheel weight will be on the steel surface 44 and only a portion carried by layer 47. The latter, however, deadens vibrations in both the rail and the wheel, thereby keeping the noise at a relatively low intensity. Rail having a cross section similar to that shown in FIGURE 8 may be utilized in frogs, switches and other areas where a division of wheel support between the upper elastomer layer and the base is desirable.

When designed and installed as herein disclosed, my rail is highly effective in substantially reducing both the noise and vibration now experienced with conventional rail. Durability and resistance to mechanical damage are excellent, particularly when the unit wheel loads are kept low. The metal base, which constitutes my preferred form of rail, also aids in distributing and equalizing the heat generated by flexing of the elastomer, and provides a strong durable member for engagement with the attaching means selected.

Since many variations of the structure of my rail are obvious to those skilled in the art, I do not limit myself to the details herein disclosed except insofar as defined in the appended claims.

I claim:

1. A rail for supporting and guiding vehicles having flanged metal wheels of predetermined minimum diameter and predetermined maximum load, comprising a rigid base having a width greater than its depth and defining substantially flat continuous upper and lower surfaces, the lower surface being adapted for engagement with a substantially continuous rigid support, and a layer of resilient elastomer uniformly bonded throughout its width and length to the upper surface of said base for load supporting engagement with said flanged wheels, said elastomer having such strength and hardness when supporting said wheels subjected to said maximum load as to deflect not less than $\frac{1}{20}$ nor more than $\frac{1}{2}$ the depth of said layer, said resilient elastomer layer having an edge substantially in alignment with an edge of said base defining a generally upright surface for engagement with the flange of said flanged metal wheel.

2. A rail for supporting and guiding vehicles having flanged metal wheels of predetermined minimum diameter and predetermined maximum load, comprising a rigid base having a width greater than its depth and defining substantially flat continuous upper and lower surfaces, the lower surface being adapted for engagement with a substantially continuous rigid support and a resilient layer consisting principally of solid polyurethane bonded uniformly throughout its base engaging surface to said upper surface of said base, said layer having a hardness of not less than 70 nor more than 100 Shore Durometer A, said resilient elastomer layer having an edge substantially in alignment with an edge of said base defining a generally upright surface for engagement with the flange of said flanged metal wheel.

3. A rail for supporting and guiding vehicles having flanged metal wheels of predetermined minimum diameter and predetermined maximum load, comprising an elongated steel base having a width at least twice its depth for attachment to a substantially continuous supporting surface, a layer of solid resilient polyurethane bonded uniformly and continuously to the upper surface of the base, said layer having a hardness of not less than 70 nor more than 100 Shore Durometer A and a metal electrical conductor embedded in and bonded to said layer, the surface of said conductor being exposed for contact with said vehicle wheel.

4. The structure defined in claim 3 wherein the thickness of said conductor is less than ⅓ the thickness of said elastomer layer.

5. The structure defined in claim 3 wherein said base is wider than said elastomer layer and at least one edge of said base and layer are in vertical alignment.

6. A rail for supporting and guiding vehicles having flanged metal wheels of predetermined minimum diameter and predetermined maximum load, comprising an elongated rigid base having a width equal to at least twice its depth and a length greater than 10 times its width, a layer of resilient elastomer covering the lower surface of the base for continuous supporting engagement with a substantially continuous coextensive member and a layer of resilient elastomer uniformly and continuously bonded to the upper surface of the base for load supporting engagement with said wheel, the width of said last mentioned layer being less than the width of the base and the thickness of said layer being at least twice the deflection produced by said wheel engaging the said upper layer and subjected to maximum load.

7. A rail for supporting and guiding vehicles having flanged metal wheels of predetermined minimum diameter and predetermined maximum load, comprising an elongated rigid base of steel having a width at least twice its depth and a length greater than 10 times its width, said base also having a plurality of openings therein near its outer edge for reception of fastening means, a resilient layer of polyurethane uniformly and continuously bonded to the upper surface of the base having a width less than the width of the base and having an inner edge in alignment with the inner edge of the base defining therewith a generally upright surface for engagement with said wheel flanges, the hardness of said layer being at least 70 Shore Durometer A and the thickness being at least twice the deflection of the layer when supporting said wheel subjected to said maximum load.

8. The structure defined in claim 7 wherein the width of said layer of polyurethane exceeds the width required to limit the maximum load imposed on said layer by said wheel to less than 3,000 p.s.i. of projected wheel engagement area.

9. A track structure for railroad vehicles utilizing flanged metal wheels comprising a concrete slab defining at least two spaced parallel-smooth, continuous surfaces, rails continuously and uniformly supported on said surfaces, each rail including a rigid, flat, elongated base having a width at least twice its depth and a length greater than 10 times its width, a resilient lower polyurethane layer bonded to the lower surface of the base and engaging one of said surfaces, a resilient upper polyurethane layer uniformly and continuously bonded to the upper surface of said base, said upper layer having a width less than the width of said base and exposing the outer edge thereof, said polyurethane layers having a Shore Durometer A hardness of not less than 70 and fastening means securing said base to said slab.

10. The structure defined in claim 9, which includes a flexible metal conductor embedded in the upper polyurethane layer of said rail, said conductor having an upper surface exposed for contact with a wheel tread.

11. A rail for supporting and guiding a vehicle having metal wheels which include a load bearing tread and a flange projecting radially beyond the tread, said wheels having a predetermined minimum tread diameter and a predetermined maximum load, comprising a rigid base having a generally horizontal uniform upper surface and an upright downwardly extending edge, said edge being disposed for engagement with the wheel flange, and a layer of resilient elastomer uniformly bonded throughout its length and width to said upper surface of the base and defining a load supporting surface for engagement with said wheel tread, one edge of said elastomer layer being substantially in alignment with said downwardly extending edge of the base, said elastomer having such strength and hardness when supporting said wheel subjected to said maximum load as to deflect not less than $\frac{1}{20}$ nor more than ½ the depth of said layer.

12. The structure defined in claim 11 wherein said elastomer layer consists principally of polyurethane and has a hardness of not less than 70 Shore Durometer A.

13. The rail structure defined in claim 11 wherein the width of said elastomer layer is not less than 3" and the hardness of said elastomer layer is not less than 70 or more than 100 Shore Durometer A.

14. The structure defined in claim 11 which includes a flexible metal conductor embedded in the layer of resilient elastomer, said conductor having an upper surface exposed for contact with the wheel tread.

15. The structure defined in claim 11 wherein said base defines a substantially flat continuous lower surface and a layer of said elastomer uniformly and continuously bonded to said lower surface and substantially coextensive therewith.

16. A rail for supporting and guiding vehicles having metal wheels, each including a load bearing tread and a flange projecting radially beyond the tread, said wheels having a predetermined minimum tread diameter and a predetermined maximum load, comprising a rigid base having a generally horizontal uniform upper surface and an upright downwardly extending edge disposed for engagement with the wheel flange and a layer of resilient elastomer uniformly bonded through its length and width to said upper surface of the base and defining a load supporting surface for engagement with said tread, one edge of said elastomer layer being substantially in alignment with said downwardly extending edge of the base, said elastomer layer having a width selected to limit the load imposed on said layer by said wheel tread when subjected to said maximum load to less than 3,000 pounds per square inch of projected wheel tread engagement area.

17. The rail structure defined in claim 16 wherein the elastomer layer has a depth and hardness selected to limit the deflection of said layer to not more than half its depth when subjected to said maximum load of 3,000 pounds per square inch of projected tread engagement area.

18. The structure defined in claim 16 which includes a flexible metal conductor embedded in the layer of resilient elastomer, said conductor having an upper surface exposed for contact with the wheel tread.

19. A rail for supporting and guiding vehicles having metal wheels of predetermined minimum diameter and predetermined maximum load, each of said wheels having a radially extending flange comprising an elongated rigid base having a width of at least 3 inches and a depth not greater than half said width, said rigid base defining substantially flat continuous upper and lower surfaces, the lower surface of the base being adapted for engagement with a substantially continuous rigid support and a layer of resilient elastomer bonded continuously and uniformly to the upper surface of said base, the resilient elastomer having a hardness of not less than 70 nor more than 100 Shore Durometer A and having an edge substantially in alignment with an edge of said base defining a generally upright surface for engagement with the flange of said metal wheel.

References Cited by the Examiner

UNITED STATES PATENTS

| | | | |
|---|---|---|---|
| 1,972,825 | 9/1934 | Funston | 238—283 |
| 2,078,811 | 4/1937 | Rouse | 238—6 |
| 2,996,256 | 8/1961 | Moses | 238—283 |
| 3,016,365 | 1/1962 | Holtschmidt | 152—330 |
| 3,042,545 | 7/1962 | Kienle | 117—75 |

ARTHUR L. LA POINT, *Primary Examiner.*

M. HILL, R. A. BERTSCH, *Assistant Examiners.*